United States Patent [19]

Alsch

[11] 4,002,088

[45] Jan. 11, 1977

[54] CLUTCH FOR A ROTARY SWITCH DRIVE SHAFT

[75] Inventor: Gottfried Alsch, Vienna, Austria

[73] Assignee: Hubert Laurenz Naimer, Vienna, Austria

[22] Filed: Apr. 10, 1975

[21] Appl. No.: 566,993

[30] Foreign Application Priority Data

Apr. 25, 1974 Austria .............................. 3421/74

[52] U.S. Cl. .............................. 74/777; 200/153 P; 74/679

[51] Int. Cl.$^2$ .................... F16H 57/10; H01H 3/00

[58] Field of Search .......... 74/777, 78 R, 785, 789, 74/679; 200/153 P; 192/4 R, 9

[56] References Cited

UNITED STATES PATENTS

| | | | |
|---|---|---|---|
| 1,963,308 | 6/1934 | Molinelli | 74/777 X |
| 2,094,730 | 10/1937 | Vandenput | 74/777 |
| 2,198,397 | 4/1940 | Szekely | 74/777 |
| 3,664,471 | 5/1972 | Seidlitz | 74/777 X |

*Primary Examiner*—Samuel Scott
*Assistant Examiner*—Lance W. Chandler
*Attorney, Agent, or Firm*—Kurt Kelman

[57] ABSTRACT

A clutch for disconnecting a drive shaft of an electric switch from a switch actuating element which includes a rotary shaft, particularly useful for the return or trip-free release of a rotary switch, comprises a differential gearing coupled between the rotary shaft of the actuating element and the switch drive shaft. The gearing includes a first gear connected to the rotary shaft for rotation therewith, a second gear connected to the drive shaft for rotation therewith, idler gears meshing with the first and second gears and transmitting rotation from one to the other, and a housing carrying the idler gears and mounted for rotation. A releasable latch carries the idler gears and is arranged selectively to permit and stop rotation of the gearing housing.

10 Claims, 6 Drawing Figures

CLUTCH FOR A ROTARY SWITCH DRIVE SHAFT

The present invention relates to a clutch means between an actuating element for selectively switching an electric switch on and off, the actuating element including a rotary shaft, and a drive shaft for the switch, the shafts being mounted coaxially. The actuating element may be a rotary knob and the clutch means is particularly useful for the return and trip-free release of rotary switches.

Various switching arrangements are known for automatically switching off an instrument actuated by a switch or for preventing the switch from being switched on at the occurrence of any impediment in the circuit, such as an undesirably high or low voltage supply or a cut-off of electric current. Such conventional arrangements usually have toggle switches and have the disadvantage that the rotary movement of the actuating element must be translated into a rectilinear movement of the toggle and this must be converted back into a rotary movement of the switch drive shaft. This multiples conversion of actuating forces involves a great number of bearings, with a concomitant increase in friction. In addition, these toggle switches are useful only for certain contact arrangements.

It is a primary object of this invention to provide a clutch of the above-indicated type which permits connection from an actuating element to a great variety of contact arrangements without interference with the functioning of the installation and while actuating multi-stage contacts which may then be released in selected positions. The contact arrangements may vary in respect of the magnitude of the angle of rotation of the switching shaft and the number of contacts and their switching programs, such as cam switches.

These and other objects and advantages are accomplished in accordance with the invention with a differential gearing coupled between the rotary shaft of the actuating element and the drive shaft. The gearing includes a first gear means connected to the rotary shaft for rotation therewith about the axis of the shafts, a second gear means meshing with the first gear means and connected to the drive shaft for rotation therewith about the axis, and a housing carrying one of the gear means and mounted for rotation about the axis. A releasable latch means is arranged selectively to permit and stop rotation of the gearing housing. In the illustrated embodiments, the second gear means comprises idler gears meshing with the first gear means and the housing carries the idler gears.

In a preferred embodiment, an exterior housing surrounds the clutch means and spring means, preferably a coaxial spiral spring, is connected between the gearing housing and the exterior housing, the spring means being biased to press the gearing housing against the latch means to prevent rotation of the gearing housing.

At the occurrence of a release impulse signal, the contact system is brought to the rest or zero position while the actuating element is released and moves into a release position totally independently of the contact system. Holding the actuating element in the "on" position at the occurrence of a release impulse signal does not prevent trip-free release of the switch. Furthermore, the return force stored in the clutch means in the zero position can release the clutch at the occurrence of a release impulse signal only in the on position and not in the zero position of the actuating element.

The above and other objects, advantages and features of the present invention will become more apparent from the following detailed description of certain now preferred embodiments thereof, taken in conjunction with the accompanying drawing wherein FIG. 1 is an exploded perspective view of a clutch means according to one embodiment of this invention, most of the exterior housing not being shown;

FIG. 1*a* and 1*b* schematically illustrate switch positions;

FIG. 2 is a vertical axial section of the clutch means shown in FIG. 1;

FIG. 3. is a top plan view of the left-side portion of FIG. 1, with the rotary shaft and cover of the exterior housing removed;

Figure 1:
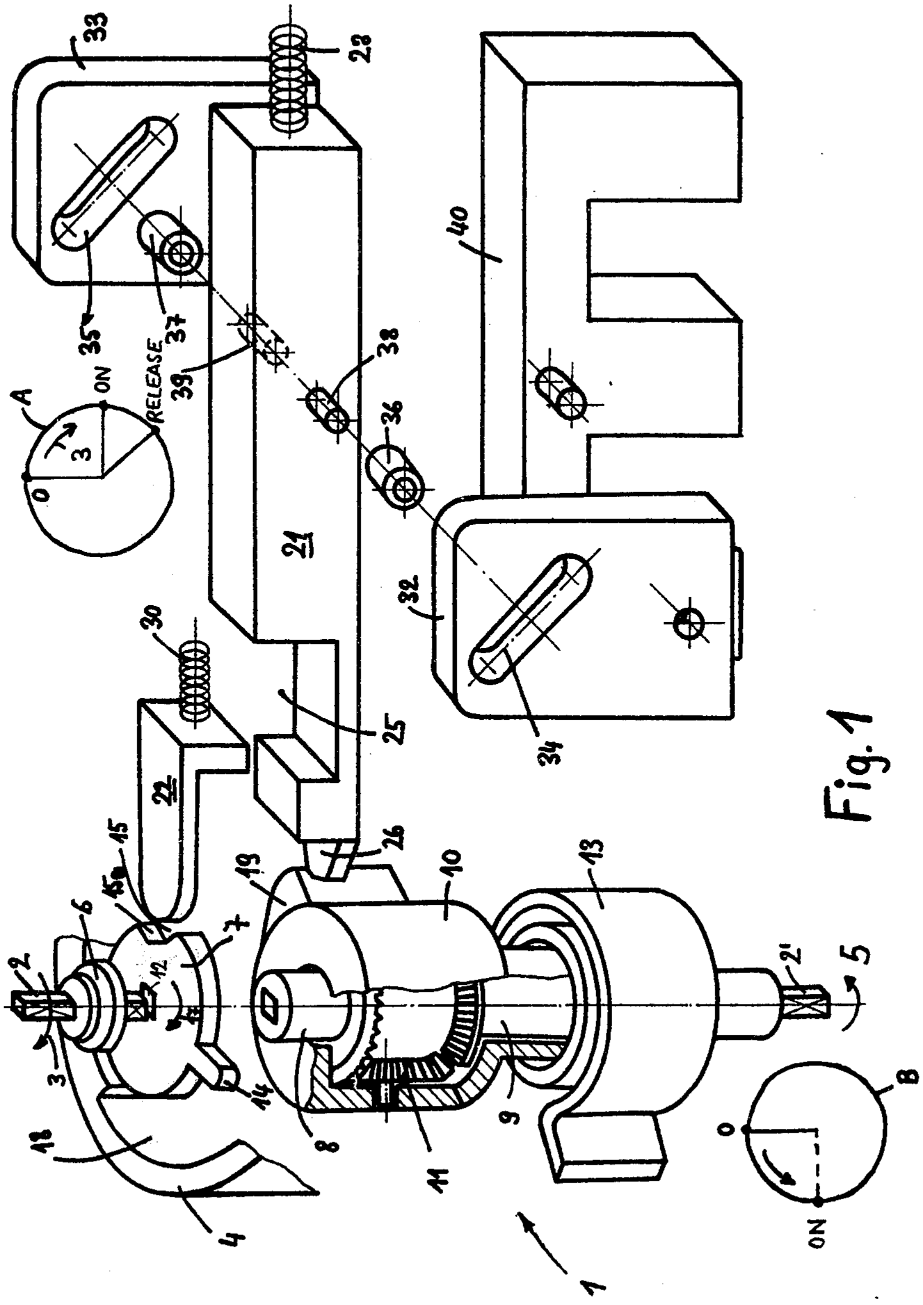

Referring now to the drawing, wherein like reference numerals designate like parts functioning in an equivalent manner in all figures, FIGS. 1 to 5 show one embodiment of the clutch between rotary shaft 2 and switch drive shaft 2'. In the illustrated embodiment, the coaxially mounted shafts are of polygonal cross section and an actuating knob (not shown) may be attached to rotary shaft 2 for ease of operation. Diagrams A and B, in FIGS. 1*a* and 1*b*, show the possible positions of actuating element 2 and drive shaft 2', as will be explained hereinafter in the description of the operation of the illustrated apparatus 1.

An exterior housing 4 consists of two laterally adjacent housing parts covered by a common closure member which has an opening holding bearing ring 6 for rotary shaft 2 whereby the rotary shaft is centered in one housing part and coaxially extends thereinto. The rotary shaft passes through polygonal bore 12 in control disc 7 underlying bearing ring 6 whereby the control disc is keyed to the rotary shaft for rotation therewith.

A differential gearing is coupled between rotary shaft 2 and drive shaft 2'. This gearing is shown to include a first gearing means consisting of bevel gear 8 which has a coaxial polygonal bore receiving rotary shaft 2 so that the shaft is keyed to the bevel gear and this gear rotates with the rotary shaft. The gearing further includes a second gearing means consisting of bevel gear 9 axially spaced from bevel gear 8, coaxial with drive shaft 2' and keyed for rotation therewith, and idler gears 11 meshing with the bevel gears and interconnecting the same. The gearing also includes housing 10 carrying idler gears 11 and mounted for rotation about the axis of the shafts and exterior housing 4. Switch drive shaft 2' has a stop (not shown) for its zero or rest position.

Figure 5:
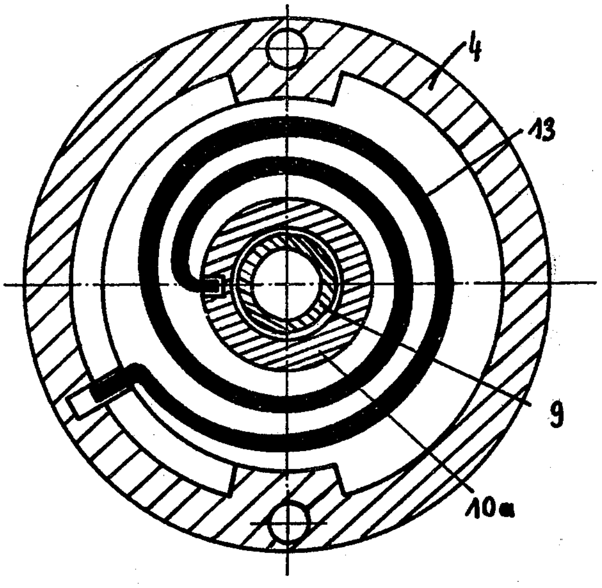
FIG. 5 is a transverse section along line V—V of FIG. 2.

Gearing housing 10 has coaxial skirt 10*a* extending therefrom, the housing skirt being coaxial with the exterior housing, and spiral spring 13 is arranged coaxially between skirt 10*a* and exterior housing 4, one end of the spiral spring being connected to the skirt and the other spiral spring end being connected to the exterior housing for biasing gearing housing 10 against the latch means to be described hereinafter and thus to prevent rotation of the gearing housing. The spring arrangement is best shown in FIG. 5.

The releasable latch means arranged selectively to permit and stop rotation of gearing housing 10 comprises locking projection 19 on the periphery of housing 10 and main plunger 21 slidable into and out of engagement with the locking projection. Stop 20 is circumferentially spaced from projection 19 on the periphery of housing 10 (see FIG. 4), and stop 20 is free to move in an arcuate chamber recessed in the wall of exterior housing 4 so as to permit limited rotation of housing 10. Main plunger 21 has stop or nose 26 cooperating with locking projection 19.

The latch means control includes control disc 7 which has stop or catch 14 extending radially from its periphery and circumferentially spaced therefrom two successive peripheral recesses 15 and 16. Stop 14 is free to move in arcuate chamber 18 in exterior housing 4 so as to permit limited rotation of the disc in the direction of arrow 17 (see FIG. 3). Seen in the direction of rotation, leading edge 16*a* of recess 16 and trailing edge 15*a* of recess 15 are flattened or bevelled in relation to the periphery of control disc 7. Auxiliary plunger 22 is slidably mounted on main plunger 21 and is spring-biased into engagement with one of the recesses in the control disc.

The laterally adjacent part of exterior housing 4 carries guideway 24 for slidable main plunger 21 which is a bolt of substantially rectangular cross section which may be reciprocated axially and in a radial direction with respect of gearing housing 10 along the guideway. The main plunger defines seat 25 for auxiliary plunger 22 which permits slidable reciprocation of the auxiliary plunger axially and in a radial direction with respect of control disc 7 along seat 25 serving as a guideway for the auxiliary plunger. The seat includes a shoulder and coil spring 30 is mounted between the shoulder and auxiliary plunger 22 for biasing the auxiliary plunger into engagement with a recess in disc 7. Spring 30 is held on frusto-conical bolt 29 extending from the rear end of auxiliary plunger 22 and spring 28 is held on frusto-conical bolt 27 extending from the rear end of main plunger 21. The bias of spring 30 acting on the auxiliary plunger exceeds that of spring 28 acting on the main plunger.

While mechanical, hydraulic or pneumatic means may be used for operating the latch means, electromagnetic operating means are illustrated herein. This electromagnetic operating means comprises an electromagnet consisting of core 40 and coil 41 cooperating with a plunger actuating element 23. Element 23 comprises a pair of walls 33, 34 of magnetic material arranged in transverse alignment with respect to main plunger 21, the walls being attracted and held in position by the electromagnet upon energization thereof. Coaxially arranged bolts 38, 39 extend transversely of the main plunger and are affixed thereto. The bolts carry rollers 36, 37 received in obliquely extending slots 34, 35 in walls 33, 34.

The apparatus described hereinabove operates as follows:

In the illustrated zero or rest position, the electromagnet is energized to hold walls 32, 33 down and thus keeps nose 26 of main plunger 21 in locking engagement with projection 19 of gearing housing 10 under the bias of spring 28. This prevents the gearing housing from rotating and holds return spring 13 under tension. In this position of the switch, auxiliary plunger 22 is in its forward position to engage the recess in control disc 7, spring 30 being substantially free of biasing tension.

When the actuating knob is turned to rotate rotary shaft 2 clockwise in the direction of arrow 3 (see FIG. 1a) from the zero position into the on position, the differential gear causes counterclockwise rotation of switch drive shaft 2' in the direction of arrow 5, see also FIG. 1*b*, the rotation of shaft 2 being transmitted to shaft 2' by bevel gears 8 and 9 respectively keyed to the shafts, and interconnecting idler gears 11. Gearing housing 10, however, is held against rotation by main plunger 21 and return spring 13 remains accordingly loaded. Auxiliary plunger 22, on the other hand, is retracted against the bias of spring 30 by the rotation of control disc 7 in the direction of arrow 17 (see FIG. 1) since this rotation causes recess 15 to move out of alignment with the auxiliary plunger and the succeeding peripheral portion of the control disc forces the spring-biased auxiliary plunger rearwardly. While the spring bias on the auxiliary plunger exceeds the bias of spring 28 acting on the main plunger, it is less than the sum of the force of spring 28 and the electromagnet acting on main plunger 21. Therefore, the main plunger remains stationary and the latch means holds gearing housing 10 against rotation. To turn the switch off, the rotation of rotary shaft 2 is reversed, the operation being otherwise identical to that hereinabove described.

When, in case of a circuit failure, such as a short circuit, insufficient voltage supply, etc., a protective circuit device comes into operation and emits a release impulse signal, the electromagnet is deenergized immediately in response to this signal, thus releasing actuating element 23 of main plunger 21. This nullifies the magnetic force acting upon the main plunger.

In this operating condition, when the knob (not shown) on rotary shaft 2 is turned to rotate the shaft and control disc 7 clockwise into the on position (FIG. 1*a*), switch drive shaft 2' at first moves with shaft 2 but counterclockwise through a small angle of rotation, due to the operation of the gearing between the two shafts described hereinabove. However, as soon as auxiliary plunger 22 has been depressed against the bias of spring 30 by the rotation of disc 7, the retracting movement of the auxiliary plunger also forces main plunger 21 to retract because the bias of spring 30 exceeds the bias of spring 28. Since no magnetic force acts on the main plunger, it is solely subject to the spring forces, the free backward sliding movement of the main plunger being possible due to the oblique extension of guide slots 34, 35 for rollers 36, 37. Thus, nose 26 will be removed from locking engagement with projection 19, enabling gearing housing 10 to be rotated clockwise about its axis under the force of return spring 13 until it has reached its zero or rest position determined by a stop (not shown). When the knob on rotary shaft 2 is released, i.e. no outside turning motion is imparted thereto, it will continue under the residual tension in spring 13 to turn clockwise into a release position (see FIG. 1*a* ) in which the spring is at rest (tensionless) and catch 14 on control disc 7 rests against a shoulder in arcuate chamber 18. Thus, the clutch means of the present invention enables switch drive shaft 2' to be readily disconnected from actuating element 2 when something is wrong in the installation in which the switch is used, the actuating knob itself automatically moving into a release position.

After the fault in the circuitry has been repaired and the protective circuit no longer emits a release impulse signal, the electromagnet is automatically re-energized.

Figure 2:
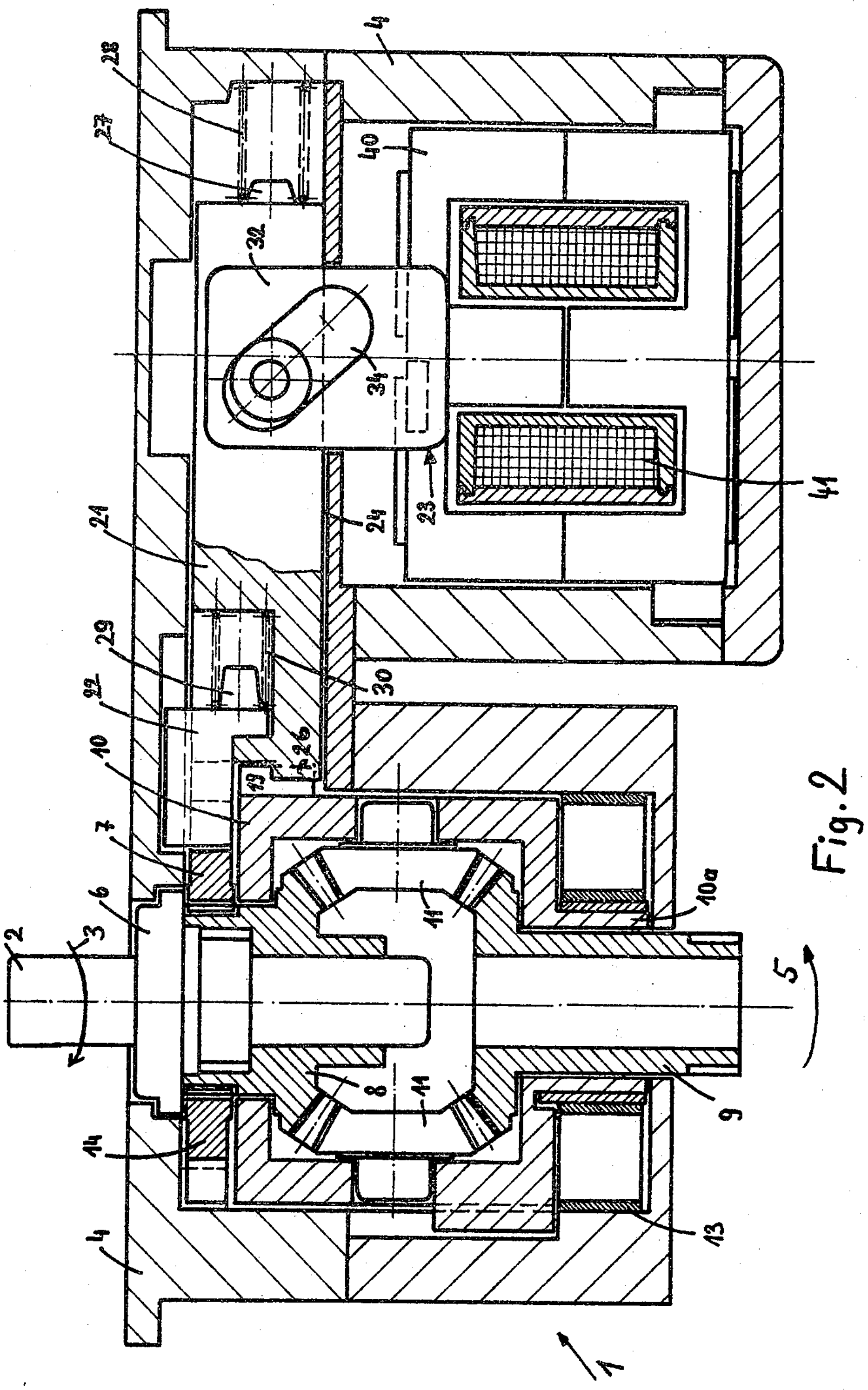
Figure 3:
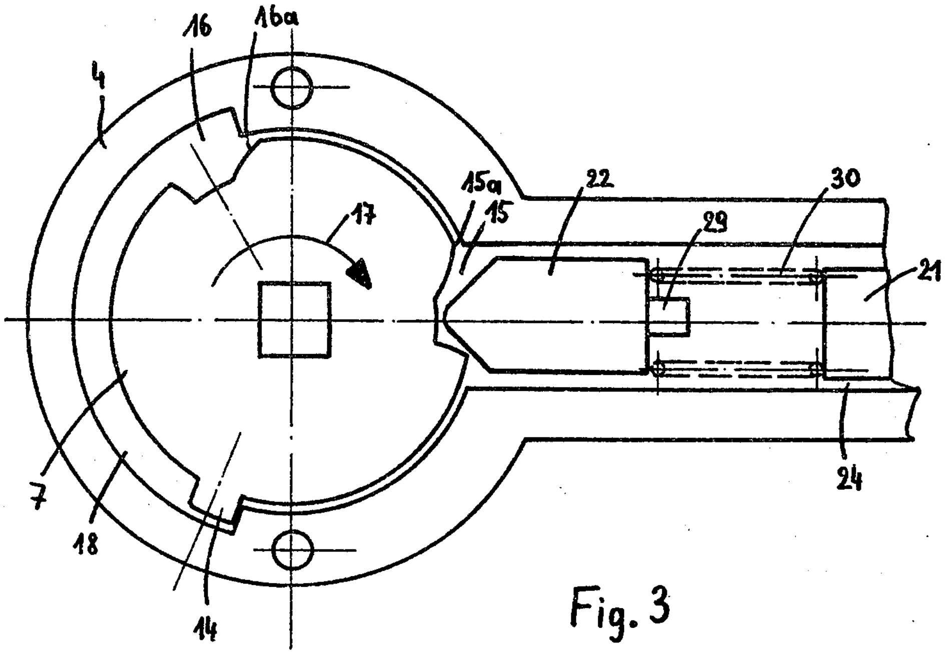
Figure 4:
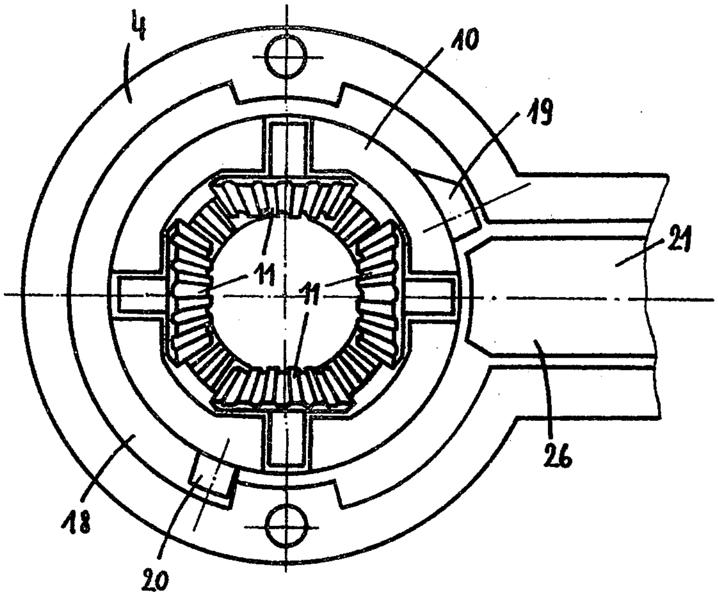
FIG. 4 is a similar top plan view showing the interior of the clutch means, with the control disc, the auxiliary plunger and the first gear means also removed.

This causes actuating element 23 to be magnetically attracted and pulled down into the position shown in FIG. 2 to reengage main plunger 21 with gearing housing 10 and auxiliary plunger 22 with control disc 7. The switch may then be operated again, i.e. shaft 2' may be turned by rotation of shaft 2, after rotary shaft 2 has been turned counterclockwise against the force of return spring 13 from it release position to the zero position (FIG. 1a) so that nose 26 locks with projection 19 and auxiliary plunger 22 rests in recess 15. As long as the circuit remains in disrepair, i.e. it emits a release impulse signal, rotary shaft 2 can be turned only into the zero position but it is not possible to turn it to the on position. As long as release impulse signal remains, the latch means cannot be engaged so that, upon release of the rotary shaft from an outside turning force, it will automatically turn into the release position. Thus, the switch cannot be operated as long as the circuit has not been repaired.

Figure 6:
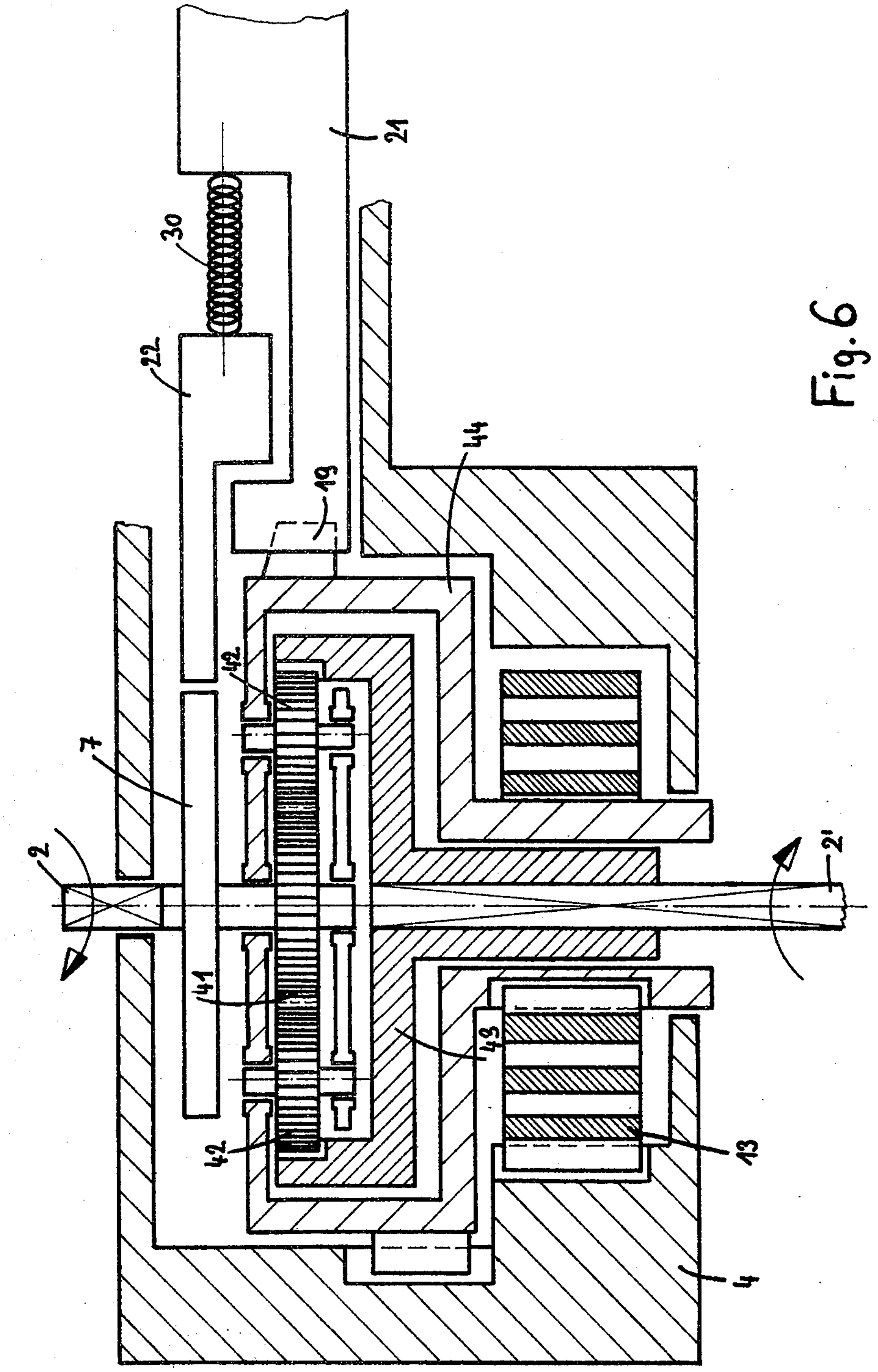
FIG. 6 is a section similar to FIG. 2 of the left-side portion of the clutch means, illustrating another embodiment of the gearing.

Gearings equivalent to that shown in FIGS. 1 and 2, may, of course, be used in the clutch means of this invention, a planetary gearing being shown by way of example in FIG. 6.

Since all other parts are unchanged in this embodiment, only the gearing will be described to avoid prolixity. The illustrated planetary gear comprises sun gear 45 keyed to rotary shaft 2 and planetary idler gears 42 carried by gearing housing 44 which is functionally equivalent to housing 10. Ring gear 43 surrounds the idler gears which mesh with gears 45 and 43 to interconnect the same. Drive shaft 2' is keyed to ring gear 43. Obviously, the ring gear could be keyed to shaft 2 and the sun gear to shaft 2'. The operation of this embodiment is identical to that hereinabove described.

While the invention has been described in connection with certain specific structural embodiments, it will be understood that variations and modification of the illustrated structures will readily occur to those skilled in the art, particularly after benefiting from the present teaching, without departing from the spirit and scope of this invention as defined in the appended claims.

What is claimed is:

1. A clutch means between an actuating element for selectively switching an electric switch on and off, the actuating element including a rotary shaft, and a drive shaft for the switch, the shafts being coaxially mounted, comprising 1. a differential gearing coupled between the rotary shaft of the actuating element and the drive shaft, the gearing including
   - a. a first bevel gear coaxial with the rotary shaft and keyed thereto for rotation therewith about the axis of the shafts,
   - b. a second bevel gear means axially spaced from the first gear, coaxial with the drive shaft and keyed thereto for rotation therewith about the axis,
   - c. idler gear means meshing with the bevel gears and interconnecting the same, and
   - d. a housing carrying the idler gear means and mounted for rotation about the axis,
2. a releasable latch means arranged selectively to permit and stop rotation of the gearing housing,
3. an exterior housing surrounding the gearing housing, and
4. spring means connected between the gearing housing and the exterior housing, the spring means being biased to press the gearing housing against the latch means to prevent rotation of the gearing housing.

2. The clutch means of claim 1, wherein the actuating element is a rotary knob.

3. The clutch means of claim 1, wherein the spring means is a spiral spring, the gearing housing, the exterior housing and the spiral spring being coaxially arranged.

4. The clutch means of claim 1, comprising electromagnetic means for operating the latch means.

5. The clutch means of claim 1, wherein the latch means comprises a locking projection on the periphery of the gearing housing and a plunger slidable into and out of engagement with the locking projection for selectively permitting rotation of the gearing housing.

6. The clutch means of claim 5, further comprising a latch means control, the control including a control disc keyed to the rotary shaft for rotation therewith, a stop on the periphery of the control disc for preventing further rotation, the periphery defining a recess circumferentially spaced from the stop, and an auxiliary plunger slidably mounted on the plunger and spring-biased into engagement with the recess.

7. The clutch means of claim 6, wherein the first-named plunger defines a seat for the auxiliary plunger permitting slidable movement of the auxiliary plunger in respect of the first-named plunger, the seat including a shoulder, and a spring mounted between the shoulder and the auxiliary plunger for biasing the auxiliary plunger into engagement with the recess.

8. The clutch means of claim 6, wherein the leading edge of the recess in the direction of rotation of the control disc is flattened in relation to the periphery of the disc.

9. The clutch means of claim 6, further comprising a spring means for biasing the first-named plunger into engagement with the locking projection, an electromagnet for slidingly actuating said plunger, the spring bias on the auxiliary plunger exceeding the bias of the spring acting on the first-named plunger but being less than the sum of the force of the spring and electromagnet acting on the first-named plunger, and no spring bias being exerted upon the auxiliary plunger in a rest position of the switch.

10. A clutch means between an actuating element for selectively switching an electric switch on and off, the actuating element including a rotary shaft, and a drive shaft for the switch, the shafts being coaxially mounted, comprising 1. a planetary gear coupled between the rotary shaft of the actuating element and the drive shaft, the planetary gear including
   - a. a sun gear coaxial with the rotary shaft and keyed thereto for rotation therewith about the axis of the shafts,
   - b. a ring gear concentrically surrounding the sun gear, the ring gear being coaxial with the drive shaft and keyed thereto for rotation therewith about the axis,
   - c. idler gear means meshing with the sun and ring gears and interconnecting the same, and
   - d. a housing carrying the idler gear means and mounted for rotation about the axis,
2. releasable latch means arranged selectively to permit and stop rotation of the gearing housing,
3. an exterior housing surrounding the gearing housing, and
4. spring means connected between the gearing housing and the exterior housing, the spring means being biased to press the gearing housing against the latch means to prevent rotation of the gearing housing.

* * * * *